United States Patent Office 3,553,191
Patented Jan. 5, 1971

3,553,191
AMINOETHYL CYCLODEXTRIN AND METHOD OF MAKING SAME
Stanley M. Parmerter, Wheaton, and Earle E. Allen, Jr., Chicago, Ill., assignors to CPC International Inc., a corporation of Delaware
No Drawing. Filed May 21, 1968, Ser. No. 730,909
Int. Cl. C08b 25/02
U.S. Cl. 260—209
2 Claims

ABSTRACT OF THE DISCLOSURE

Cyclodextrin is reacted with ethylenimine to yield aminoethylcyclodextrin. The aminoethyl cyclodextrin may be used as a clathrating compound or as a paper sizing.

BACKGROUND OF THE INVENTION

This invention relates to substituted cyclodextrin compounds. More specifically this invention relates to aminoethylcyclodextrins and methods of making them.

Cyclodextrins are well known in the art. Generally speaking, they are a group of homologous oligosaccharides also known as Schardinger dextrins from an early investigator who studied these materials. Investigation has revealed that these compounds are a series of homologous cyclic molecules containing 6 or more α-D glucopyranose units linked together at the 1,4 positions as in amylose. This cyclic molecule may also be referred to as a torus. Stemming from its cyclic arrangement, this torus is characterized by having neither a reducing end group nor a nonreducing end group. For illustration purposes, the molecule is depicted in the following schematic formula wherein the hydroxyls are shown in the 2,3, and 6 positions in the anhydroglucose units. The letter $n$ may be a number from 4 to 6, or higher.

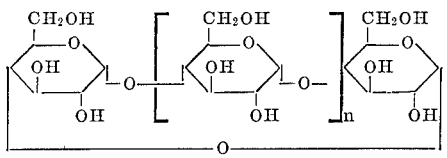

When $n$ is 4, the torus molecule is known as α-cyclodextrin or cyclohexaamylose, because the torus contains six anhydroglucose units; when $n$ is 5, the seven unit member is known as β-cyclodextrin or cycloheptaamylose; and when $n$ is 6, the eight unit member is known as γ-cyclodextrin or cyclooctaamylose. When reference is made herein to "cyclodextrin," it is intended to include the foregoing forms as well as still other tori that have a still larger number of units in the molecule, and, as well, mixtures of these and other homologs.

Cyclodextrin is produced from starch by the action of an enzyme commonly known as cyclodextrin transglucosylase (*B. macerans amylase*). The source of the enzyme is usually a culture of *Bacillus macerans* which is grown under conventional conditions on conventional media containing sources of nitrogen, carbon, growth factors and minerals. The cyclodextrin transglucosylase may be produced by following published teachings such as, for example, those described by D. French in Methods in Enzymology, S. P. Colowick and N. O. Kaplan, editors, Academic Press, New York, N.Y., vol. V, 1962, pp. 148–155.

The cyclodextrin transglucosylase activity in cultures of *Bacillus macerans* may be measured by the Tilden-Hudson procedure as described by these two workers in J. Bacteriol., 43, 527–544, 1942. In general, the cyclodextrin transglucosylase is added to a dilute solution of a gelatinized starch, whereupon a conversion to cyclodextrin occurs by enzymolysis. Procedures for making and isolating the cyclodextrins have been described in the literature, for example, by F. Cramer and D. Steinle, Ann., 595, 81 (1955). If desired, the various homologs such as, for example, the alpha, beta, and gamma, may be fractionated by procedures such as those described by D. French, et al., J. Am. Chem. Soc., 71, 353 (1949).

The various homologous cyclodextrins, having from six to eight anhydroglucose units, or higher, and their mixtures, may be used as equivalent materials for the purposes of this invention. In practice, there may be little reason for separating the various fractions, and the cyclodextrin employed may contain a preponderance of β-cyclodextrin, for example. No distinction is intended between the various homologous cyclodextrins or their mixtures unless otherwise indicated, when using the term "cyclodextrin."

The utility of cyclodextrin is well established. For example, cyclodextrin may be used as a clathrating compound. That is to say, it is adapted to form inclusion compounds. It is known to form a variety of crystalline complexes with many organic substances, particularly with organic liquids of low solubility in water. It is also known to form various complexes with neutral salts, halogens, and bases. In referring to the inclusion and clathrating properties, reference is often made to the torus molecule being a host molecule and the included or complexed molecule being the guest molecule. Once given this established use of cyclodextrin, it is understandably desirable to provide novel cyclodextrin structures which may be used in the same way or for other purposes to thereby establish further utility for cyclodextrin as well as novel structures.

SUMMARY OF THE INVENTION

This invention contemplates the formation of several new cyclodextrin structures which may be used as clathrating compounds or as paper sizings. These compounds, which contain primary amino groups, are soluble in dilute hydrochloric acid and will react with aldehydes and dialdehydes to form Schiff bases and less soluble cross-linked products, respectively.

Basically, the compounds of this invention are aminoethyl cyclodextrins which may be characterized by the formula:

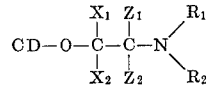

wherein CD represents a basic cyclodextrin structure having at least one of its hydroxyl group converted to an ether group; $X_1$, $X_2$, $Z_1$ and $Z_2$ are members selected from the group consisting of hydrogen, aliphatic organic structures, and cyclic organic structures; and $R_1$ and $R_2$ are members selected from the group consisting of hydrogen, primary ethylamine, secondary polyethylamines, tertiary polyethylamines, and substituted derivatives thereof. By "substituted derivatives" is meant an amine as described where a hydrogen which was attached to a carbon atom in the amine structure has been replaced by an aliphatic or cyclic organic structure.

Generally speaking these compounds may be made by a unique process which comprises reacting cyclodextrin with ethylenimine or substituted derivatives thereof, with or without a catalyst and preferably in the presence of an aprotic solvent. By "aprotic solvent" is meant a solvent which is neither a proton acceptor nor a proton donor.

DETAILED DESCRIPTION OF THE INVENTION INCLUDING PREFERRED EMBODIMENTS

The unique compounds of this invention are aminoethyl cyclodextrins which, before being put into use, terminate in at least one primary amine group. As described above, these compounds are generally characterized by the formula:

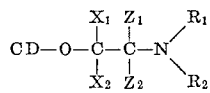

wherein CD represents a basic cyclodextrin structure having at least one etherified hydroxyl group; $X_1$, $X_2$, $Z_1$ and $Z_2$ are members selected from the group consisting of hydrogen, aliphatic organic structures, and cyclic organic structures, and $R_1$ and $R_2$ are members selected from the group consisting of hydrogen, primary ethylamine, secondary polyethylamines, tertiary polyethylamines and substituted derivatives thereof. The term "substituted derivative" is used here as defined hereinabove.

When $X_1$, $X_2$, $Z_1$, and $Z_2$ are hydrogen and $R_1$ and $R_2$ are not substituted derivatives, the compounds thus defined form preferred compounds of this invention and may be represented by the formula

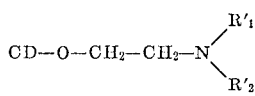

wherein CD represents a basic cyclodextrin structure having at least one etherified hydroxyl group as illustrated and $R_1'$ and $R_2'$ are selected from the group consisting of H, primary ethylamine, secondary polyethylamines, and tertiary polyethylamines. Primary ethylamine as contemplated by this invention is characterized by the formula —$CH_2$—$CH_2$—$NH_2$. Secondary polyethylamines as contemplated herein are characterized by the formula

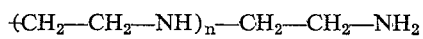

wherein $n$ is a whole number of at least 1. Tertiary polyethylamines are in part characterized for purposes of this invention by the formula

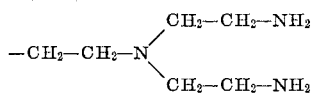

Other examples of tertiary polyethylamines may be characterized by the formula:

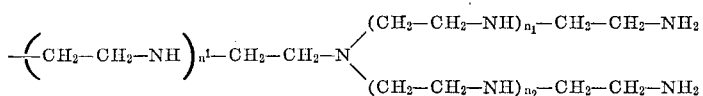

wherein $n^1$, $n_1$ and $n_2$ are zero or a whole number. Of course, it is clear that when $n^1$, $n_1$ and $n_2$ are zero, the basic tertiary polyethylamines as illustrated above are defined. It is also clear that the tertiary polyethylamines formed herein are not limited to those amines having a single tertiary amine group within the basic chain, since this invention also contemplates within its scope polyethylamines which contain a plurality of tertiary amine groups. In all instances, however, the tertiary amine will terminate in at least one primary amine group.

Although the unique compounds of this invention as described hereinabove may be formed by any conventional process of etherifying a hydroxyl with an amine compound, it has now been found that these compounds can be readily formed by a unique process which basically comprises reacting cyclodextrin with ethylenimine or substituted derivative thereof to form aminoethylcyclodextrin. Because of the uniqueness of this method, it is considered a part of this invention.

The reaction of cyclodextrin with ethylenimine or a substituted derivative thereof may be effected with or without a catalyst. Preferably, however, a catalyst such as acetic acid is used. A liquid reaction medium is also generally preferred. Such a liquid reaction medium should preferably comprise at least one aprotic solvent. Aprotic solvents are well known in the art, an example of which is toluene.

"Cyclodextrin" is used generically as hereinbefore defined. Any well known cyclodextrin structure may be used to form the compounds of this invention. Examples of these structures are α-cyclodextrin, β-cyclodextrin, γ-cyclodextrin, and mixtures thereof. Likewise, ethylenimine (dihydroazirine) and its substituted derivatives are well known in the art, examples of which include 1-methylethylenimine, 1-ethyl-ethylenimine, 1-propylethylenimine and the like.

In its simplest form the reaction of a cyclodextrin and ethylenimine to form aminoethylcyclodextrin may be represented as follows:

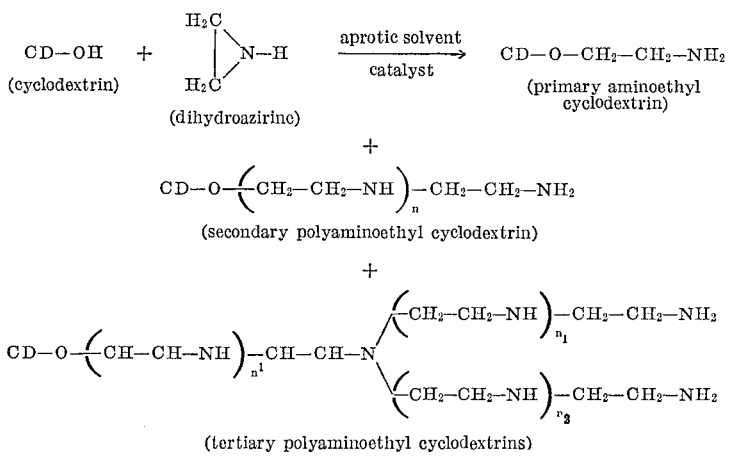

This formula as set forth is illustrative of the fact that in most instances the resulting aminoethylcyclodextrin is a mixture of primary, secondary, and tertiary amine groups as well as of primary ethyl amine and polyethylamines. The term "aminoethylcyclodextrin" is thus used herein in its generic sense to include all types of ethylamines formed. The individual compounds within the mixture may be separated later if desired. In each instance, the aminoethyl cyclodextrin compounds produced terminate in at least one primary amine group, —NH. Although not limited to any specific theory, it is believed that it is this characteristic of terminating in at least one —NH₂ group which gives the compounds of this invention their unique properties and allows them to be used for paper and cellulose treating purposes.

In practice the reaction of cyclodextrin and ethylenimine or derivative thereof may be conveniently effected by initially suspending the cyclodextrin in an aprotic solvent such as toluene. To this suspension is then added the ethylenimine, slowly and with constant stirring. Preferably from about 2 to 4 parts by weight of cyclodextrin are used per part by weight of ethylenimine. To this reaction mixture, if desired, may be added a catalyst such as acetic acid preferably in glacial form. The resulting mixture is then stirred for a short time such as about 1–3 hours at elevated temperatures and then allowed to stand for a longer period of time such as for 10–20 hours without heating. By using this method a solid product precipitates which as analyzed comprises aminoethyl cyclodextrin.

The following examples set forth the the best mode contemplated for carrying out this invention. They are for illustrative purposes and are not means as limitations upon this invention whose scope is defined by the hereinafter following claims.

EXAMPLE I

To a suspension of 10 g. of β-cyclodextrin in 75 ml. of toluene was added dropwise with stirring 2.7 g. of ethylenimine. Then 0.35 ml. of glacial acetic acid was added dropwise. The mixture was stirred for one hour at 25° C. and then 2 hrs. at 99° C. before it was left for 16 hours without heating. The solid was collected and washed thoroughly with a solution of 10% concentrated HCl in methanol followed by extensive washing with methanol. The white fluffy product contained 1.22% nitrogen.

EXAMPLE II

The procedure of Example I was repeated using 56.7 g. β-cyclodextrin, 15 g. ethylenimine, 2.4 g. acetic acid and 275 ml. toluene. In this case the mixture was heated immediately to 75° C., stirred at this temperature for one hour, left at room temperature for 18 hours and then refluxed for one hour. The product was collected and washed as in Example I and dried in a vacuum oven at 40° for two hours. It contained 3.25% total nitrogen (Kjeldahl) and 1.19% primary amino nitrogen (Van Slyke). This corresponds to a D.S. of 0.14 of primary amine. It melted above 300° with decomposition. By D.S. is meant the degree of substitution attained during the reaction. This term is well understood in the art and when applied to this invention refers to the average number of hydroxyls etherified per anhydroglucose unit. Where 3 hydroxyls per anhydroglucose unit are present in the torus molecule, the maximum D.S. would be 3.

EXAMPLE III

The reaction of Example I was repeated using 56.7 g. of β-cyclodextrin, 500 ml. of toluene, 15.1 g. of ethylenimine and 2.3 ml. of acetic acid. The product contained 1.3% total nitrogen (Kjeldahl) and 0.45% primary amino nitrogen (Van Slyke). This corresponds to a D.S. of 0.052 of primary amine.

EXAMPLE IV

The procedure of Example III was repeated except that no acetic acid was used. The product contained 1.2% total nitrogen (Kjeldahl) and 0.62% primary amino nitrogen (Van Slyke) corresponding to a D.S. of 0.073 of primary amine.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

We claim:

1. Aminoethyl cyclodextrin having the following formula:

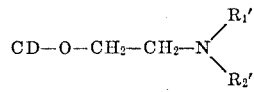

wherein CD represents a cyclodextrin structure having at least one etherified hydroxyl group and $R'_1$ and $R'_2$ are selected from the group consisting of hydrogen,

—CH₂—CH₂—NH₂

(—CH₂—CH₂—NH)ₙ—CH₂—CH₂—NH₂ where $n$ is a whole number of at least 1; and

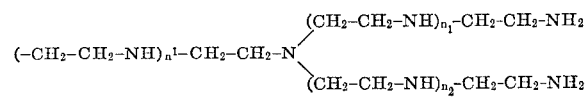

where $n^1$, $n_1$ and $n_2$ are zero or a whole number.

2. Aminoethyl cyclodextrin as in claim 1, wherein $R'_1$ and $R'_2$ are hydrogen.

References Cited

UNITED STATES PATENTS

| | | | |
|---|---|---|---|
| 2,856,307 | 10/1958 | Fredrickson | 260—209D |
| 2,917,506 | 12/1959 | Caldwell et al. | 260—234 |
| 3,061,444 | 10/1962 | Rogers et al. | 260—209D |
| 3,140,184 | 7/1964 | Robbins | 260—209D |

LEWIS GOTTS, Primary Examiner

J. R. BROWN, Assistant Examiner

U.S. Cl. X.R.

162—175